(12) United States Patent
Alland et al.

(10) Patent No.: US 8,604,968 B2
(45) Date of Patent: Dec. 10, 2013

(54) INTEGRATED RADAR-CAMERA SENSOR

(75) Inventors: Stephen W. Alland, Newbury Park, CA (US); Richard C. Lind, Noblesville, IN (US); William G. Shogren, Noblesville, IN (US); Lawrence A. Humm, West Hills, CA (US); William A. Bauson, Zambia (ZM); Shawn Shi, Thousand Oaks, CA (US)

(73) Assignee: Delphi Technologies, Inc., Troy, MI (US)

( * ) Notice: Subject to any disclaimer, the term of this patent is extended or adjusted under 35 U.S.C. 154(b) by 245 days.

(21) Appl. No.: 13/119,307

(22) PCT Filed: Oct. 6, 2009

(86) PCT No.: PCT/US2009/059650
§ 371 (c)(1),
(2), (4) Date: Mar. 16, 2011

(87) PCT Pub. No.: WO2010/042483
PCT Pub. Date: Apr. 15, 2010

(65) Prior Publication Data
US 2011/0163904 A1     Jul. 7, 2011

Related U.S. Application Data

(60) Provisional application No. 61/103,680, filed on Oct. 8, 2008.

(51) Int. Cl.
*G01S 13/00* (2006.01)
(52) U.S. Cl.
USPC .................. 342/70; 342/22; 342/27

(58) Field of Classification Search
USPC .................. 342/22, 27–28, 70–72
See application file for complete search history.

(56) References Cited

U.S. PATENT DOCUMENTS

| | | | |
|---|---|---|---|
| 5,525,988 A * | 6/1996 | Perkins et al. | 342/4 |
| 5,757,319 A * | 5/1998 | Loo et al. | 342/375 |
| 5,861,845 A | 1/1999 | Lee et al. | |
| 6,452,535 B1 | 9/2002 | Rao et al. | |
| 6,511,216 B2 | 1/2003 | Strickland | |
| 6,771,208 B2 | 8/2004 | Lutter et al. | |
| 6,862,537 B2 | 3/2005 | Skrbina et al. | |
| 7,095,567 B2 | 8/2006 | Troxell et al. | |
| 7,322,755 B2 | 1/2008 | Neumann et al. | |
| 7,706,978 B2 | 4/2010 | Schiffmann et al. | |
| 7,737,832 B2 | 6/2010 | Baratoff et al. | |
| 8,294,608 B1 | 10/2012 | Lynam | |
| 2002/0003571 A1 | 1/2002 | Schofield et al. | |

(Continued)

FOREIGN PATENT DOCUMENTS

CA      2202320      10/1997
JP      2006-188224   7/2006

OTHER PUBLICATIONS

English Translation of Japan Office Action dated Jun. 10, 2013.

*Primary Examiner* — Timothy A Brainard
(74) *Attorney, Agent, or Firm* — Lawrence D. Hazelton

(57) ABSTRACT

An integrated radar-camera sensor is provided which includes a camera sensor component and a radar sensor component both housed within a common single module housing. The sensor module also includes processing circuitry for processing the radar sensor and camera outputs. The sensor module is located behind the windshield of a vehicle and may include glare and/or EMI shields.

31 Claims, 8 Drawing Sheets

(56) References Cited

U.S. PATENT DOCUMENTS

| | | |
|---|---|---|
| 2003/0154010 A1 | 8/2003 | Rao et al. |
| 2003/0201929 A1 | 10/2003 | Lutter et al. |
| 2006/0034002 A1* | 2/2006 | Troxell et al. ............ 359/737 |
| 2006/0125919 A1 | 6/2006 | Camilleri et al. |
| 2006/0146552 A1 | 7/2006 | Shaffer |
| 2006/0170593 A1 | 8/2006 | Watts |
| 2007/0055446 A1 | 3/2007 | Schiffmann et al. |
| 2007/0190760 A1 | 8/2007 | Coolbaugh et al. |
| 2009/0204291 A1* | 8/2009 | Cernasov ..................... 701/36 |
| 2010/0001897 A1* | 1/2010 | Lyman ........................ 342/70 |
| 2010/0084176 A1* | 4/2010 | Kim .......................... 174/261 |

\* cited by examiner

US 8,604,968 B2

INTEGRATED RADAR-CAMERA SENSOR

CROSS-REFERENCE TO RELATED APPLICATION

This application claims the benefit under 35 U.S.C. §119 (e) of U.S. Provisional Patent Application No. 61/103,680, filed on Oct. 8, 2008, the entire disclosure of which is hereby incorporated herein by reference.

TECHNICAL FIELD

The present invention generally relates to an integrated radar and camera module (RACam) for detecting the presence of an object, and more specifically relates to such a sensor module that detects objects, such as objects near a vehicle, for enhanced vehicle safety.

BACKGROUND OF THE INVENTION

Radar and camera sensors are often employed on vehicles to enable systems for enhanced vehicle safety including Adaptive Cruise Control (ACC), Forward Collision Warning (FCW), collision mitigation or avoidance via autonomous braking, pre-crash functions such as airbag arming or pre-activation, and Lane Departure Warning (LDW). Systems that employ both radar and camera sensors provide high level active safety capability and are available on production vehicles. However, the cost of conventional systems is typically high and integration into the vehicle system is generally complex, due to the need for multiple sensors at multiple locations, currently limiting these systems to optional equipment on luxury vehicles.

Integration of the radar and camera sensor for use in a vehicle could significantly reduce sensor cost and vehicle integration cost to enable high capability active safety systems to be offered as standard equipment on many vehicles. However, many design challenges need to be overcome to effectively implement an integrated radar-camera sensor that meets application requirements and vehicle integration constraints.

SUMMARY OF THE INVENTION

According to one aspect of the present invention, a sensor module is provided that comprises a sensor module housing comprising a plurality of walls. A camera is located in the module housing for capturing images based on light waves. A radar sensor component is also located within the module housing for emitting a radar beam and receiving reflected radar signals. The sensor module further includes processing circuitry for processing the captured images and the received reflected radar signals and providing an indication of the detection of a presence of one or more objects.

According to another aspect of the present invention, a sensor module for use on a vehicle for detecting one or more objects relative to the vehicle is provided. The sensor module comprises a sensor module housing behind a windshield of a vehicle, and a radar sensor component located within the housing behind the windshield. An electromagnetic interference shield is disposed to one or more sides of the radar sensor for shielding electromagnetic radiation from the radar sensor component. The sensor module further includes processing circuitry for processing radar signals received with the radar sensor component.

According to a further aspect of the present invention, a method for detecting one or more objects relative to a vehicle is provided. The method comprises the steps of providing a camera component in a module housing and providing a radar sensor component in the module housing to provide an integrated sensor module, and mounting the sensor module behind a windshield of the vehicle. The method also includes the steps of capturing images forward of the vehicle passing through the windshield with the camera component, transmitting a radar signal forward of the vehicle through the windshield with the radar sensor component, and receiving reflected radar signals from one or more objects forward of the vehicle with the radar sensor component. The method further includes the step of processing the video images captured by the camera component and the reflected radar signals received by the radar sensor component for use in detecting an object relative to the vehicle.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
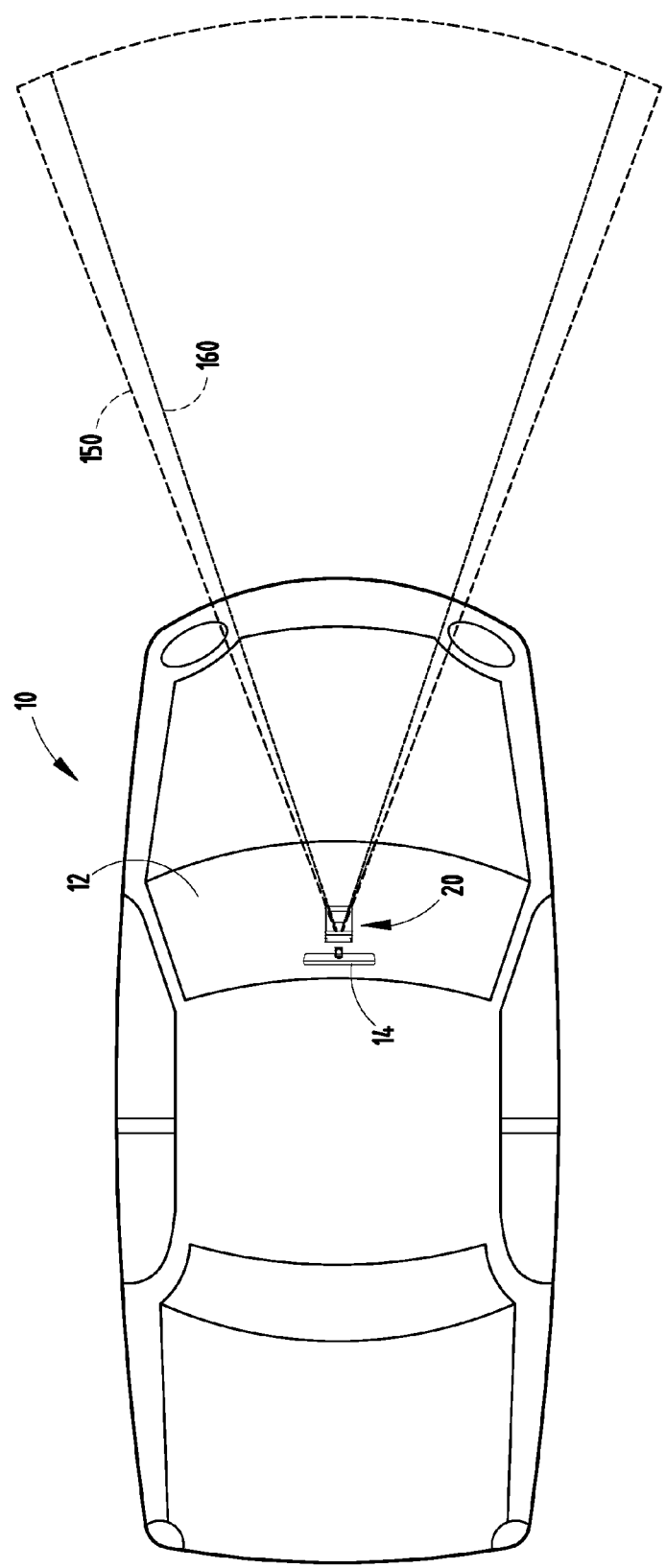
FIG. 1 is a top view of a vehicle employing an integrated radar-camera sensor behind the windshield, according to one embodiment.

Referring now to FIG. 1, an automotive vehicle 10 is generally illustrated employing an integrated radar-camera sensor module 20 generally shown located in the vehicle interior compartment behind the windshield 12 and generally forward of the interior rearview mirror 14. The integrated radar-camera sensor module 20 includes a radar sensor component for transmitting radar signals through the windshield 12 and forward of the vehicle 10 in a radar field of view horizontal coverage zone shown by dashed lines 150 and receives reflected radar signals that are reflected off of one or more objects within the coverage zone 150. Additionally, the integrated radar-camera sensor module 20 employs a camera component for capturing images based on light waves that are seen and captured through the windshield 12 in a camera field of view horizontal coverage zone shown by dashed line 160.

The automotive vehicle 10 may include a passenger car having road wheels for engaging a road, according to one embodiment. The integrated radar-camera sensor module 20 detects one or more objects relative to the vehicle 10. Additionally, the sensor module 20 may have further capabilities to estimate the parameters of the detected object(s) including, for example, the object position and velocity vectors, target size, and classification, e.g., vehicle verses pedestrian. The integrated radar-camera sensor module 20 may be employed onboard the vehicle 10 for automotive safety applications including adaptive cruise control (ACC), forward collision warning (FCW), and collision mitigation or avoidance via autonomous braking and lane departure warning (LDW).

Figure 2:
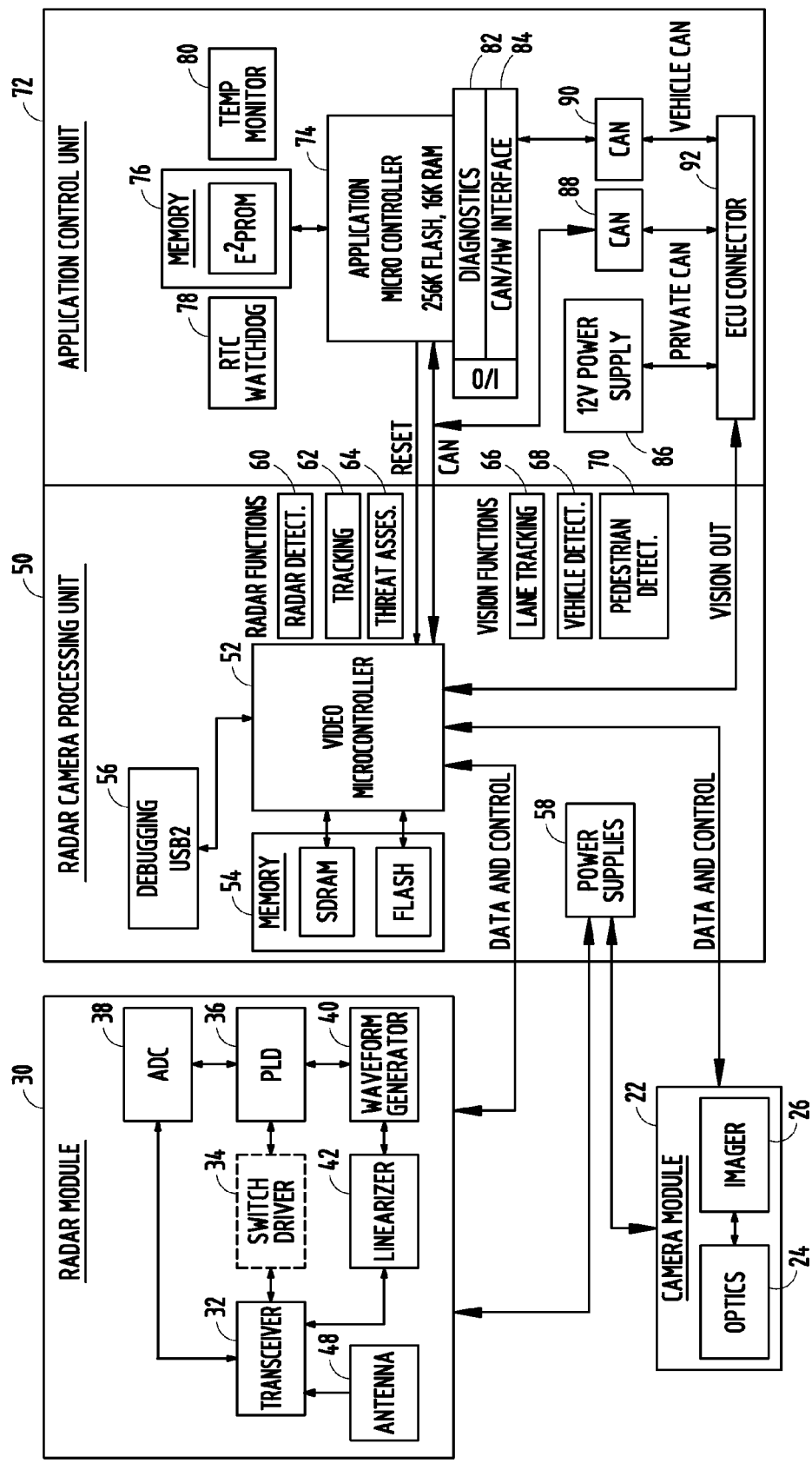
FIG. 2 is a block diagram illustrating the integrated radar-camera sensor, according to one embodiment.

The integrated radar-camera sensor module 20 advantageously integrates both radar and camera in a single module contained within a common housing. The integrated radar-camera sensor module 20 is advantageously installed within the passenger compartment of the vehicle 10, behind the windshield 12 and in front of the rearview mirror assembly 14. The integration of the camera and the radar into a common single module advantageously results in a reduction in sensor costs. Additionally, the camera and radar integration advantageously employs common or shared electronics and signal processing as shown in FIG. 2. The integrated signal processor architecture employed by the sensor module 20 enables low level radar-camera data fusion. The radar may employ a radar antenna with vertical polarization for effective operation behind the windshield 12. The radar antenna and camera may be integrated onto a single board. The camera may employ a wafer scale camera, according to one embodiment. A glare shield may be employed to shield glare from the camera, or alternatively refractive block optics may be employed to eliminate the need for the glare shield. A parallel plate lens for the radar antenna may be employed to minimize size of an electromagnetic interference shield and to squint the radar beam output. A joint radar-camera alignment technique may be employed to advantageously align both the radar and the camera provided in the integrated radar-camera sensor module. Further, optimized radar-camera fusion may exploit the complimentary sensor attributes to minimize radar component specification and costs.

Figure 3:
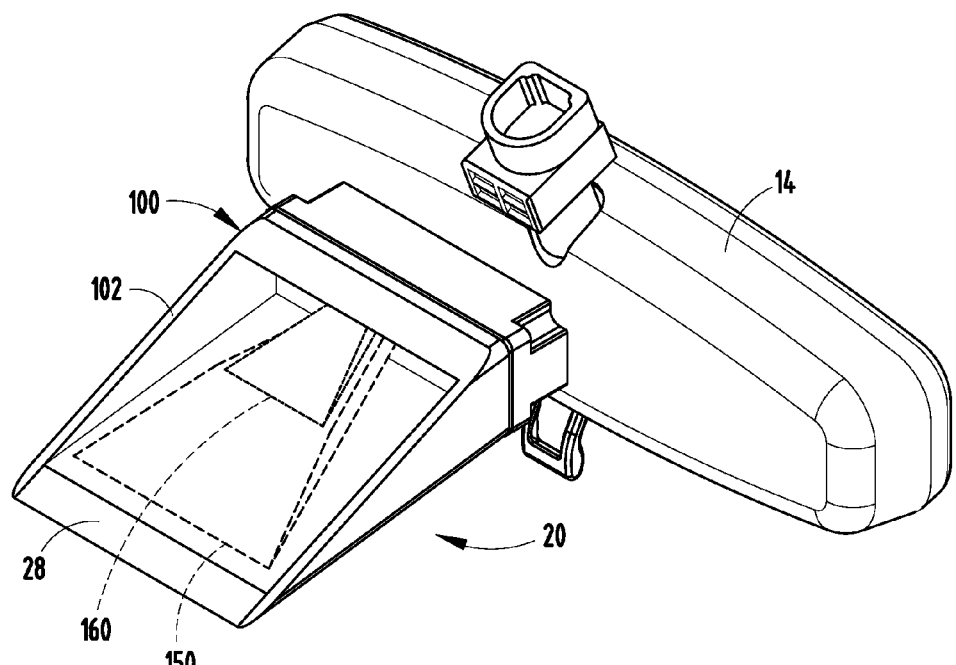
FIG. 3 is a perspective view of the integrated radar-camera sensor arranged forward of a rearview mirror assembly, according to one embodiment.
Figure 4:
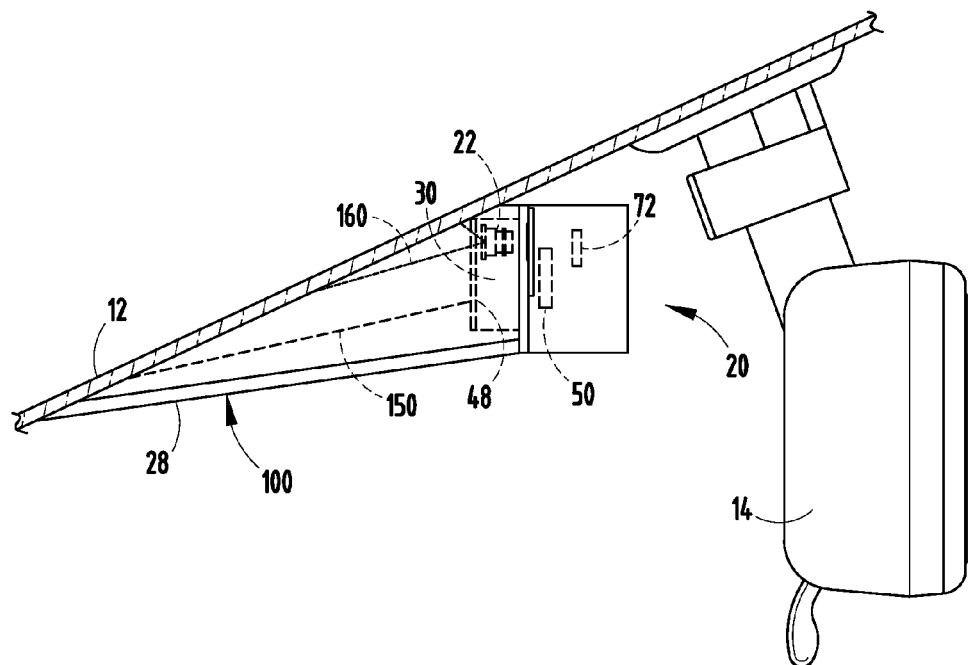
FIG. 4 is a side view of the integrated radar-camera sensor shown mounted to the interior surface of the windshield of the vehicle.

The sensing module 20 advantageously employs a sensor module housing 100 comprising a plurality of walls as shown in FIGS. 3 and 4, according to one embodiment. The sensor module 20 includes a camera component 22 located in the module housing 100 for capturing images based on light waves. Sensor module 20 also includes a radar sensor component 30 located within the module housing 100 for emitting a radar beam and receiving reflected radar signals. The sensing module 20 further includes processing circuitry 50 for processing the captured images and the received reflected radar signals and providing an indication of the detection of the presence of one or more objects detected in the coverage zones 150 and 160.

The integrated radar-camera sensor module 20 is shown in FIG. 2 having various components, according to one embodiment. The sensor module 20 includes the radar component 30, the camera component 22, the radar-camera processing unit 50 and an application control unit 72. The radar component 30 and camera component 22 both communicate with the radar-camera processing unit 50 to process the received radar signals and camera generated images so that the sensed radar and camera signals are useful for various radar and vision functions. The application control unit 72 may be integrated within the radar-camera processing unit or may be separate therefrom. The application control unit 72 may execute any of a number of known applications that utilize the processed radar and camera signals including, but not limited to ACC, FCW and LDW.

The camera component 22 is shown in FIG. 2 including both optics 24 and imager 26. It should be appreciated that the camera component 22 may include a commercially available off the shelf camera for generating video images. For example, the camera component 22 may include a wafer scale camera, or other image acquisition device. Camera component 22 receives power from the power supply 58 of processing unit 50 and communicates data and control signals with a video microcontroller 52 of the radar-camera processing unit 50.

The radar component 30 is shown having a radar transceiver 32 coupled to an antenna 48. The transceiver 32 and antenna 48 operate to transmit radar signals within the desired coverage zone or beam 150 and to receive reflected radar signals reflected from objects within the coverage zone 150. The radar component 30 may transmit a single fan-shaped radar beam and form multiple receive beams by receive digital beamforming, according to one embodiment. The antenna 48 may include a vertical polarization antenna for providing vertical polarization of the radar signal which provides good propagation over angles of interest for the windshield, such as a seventy degree (70°) incidence angle. Alternately, a horizontal polarization antenna may be employed; however, the horizontal polarization is more sensitive to the RF properties and parameters of the windshield for high incidence angle.

The radar component 30 may also include a switch driver 34 coupled to the transceiver 32 and further coupled to a programmable logic device (PLD) 36. The programmable logic device (PLD) 36 controls the switch driver in a manner synchronous with the analog-to-digital converter (ADC) 38 which, in turn, samples and digitizes signals received from the transceiver 32. The radar component 30 also includes a waveform generator 40 and a linearizer 42. The radar sensor 30 may generate a fan-shaped output which may be achieved using electronic beam forming techniques. One example of a suitable radar sensor operates at a frequency of 76.5 gigahertz. It should be appreciated that the automotive radar may operate in one of several other available frequency bands, including 24 GHz ISM, 24 GHz UWB, 76.5 GHz, and 79 GHz.

The radar-camera processing unit 50 is shown employing a video microcontroller 52, which includes processing circuitry, such as a microprocessor. The video microcontroller 52 communicates with memory 54 which may include SDRAM and flash memory, amongst other available memory devices. A debugging USB2 device 56 is also shown communicating with the video microcontroller 52. The video microcontroller 52 communicates data and control with each of the radar component 30 and camera component 22. This may include the video microcontroller 52 controlling the radar component 30 and camera component 22 and includes receiving images from the camera component 22 and digitized samples of the received reflected radar signals from the radar component 30. The video microcontroller 52 may process the received radar signals and camera images and provide various radar and vision functions. For example, the radar functions executed by video microcontroller 52 may include radar detection 60, tracking 62 and threat assessment 64, each of which may be implemented via a routine or algorithm. Similarly, the video microcontroller 52 may implement vision functions including lane tracking 66, vehicle detection 68, and pedestrian detection 70, each of which may be implanted via routines or algorithms. It should be appreciated that the video microcontroller 52 may perform various functions related to either radar or vision utilizing one or both of the outputs of the radar component 30 and camera component 22.

The application control unit 72 is shown communicating with the video microcontroller 52 by way of a controller area network (CAN) bus and a vision output line. The application control unit 72 includes an application microcontroller 74 coupled to memory 76 which may include electronically erasable programmable read-only memory (EEPROM), amongst other memory devices. The application control unit 72 is also shown including an RTC watchdog 78, temperature monitor 80 and input/output interface for diagnostics 82, and CAN/HW interface 84. The application control unit 72 includes a twelve (12) volt power supply 86 which may be a connection to the vehicle battery. Further, the application control unit 72 includes a private CAN interface 88 and a vehicle CAN interface 90, both shown connected to an electronic control unit (ECU) that is connected to connector 92.

The application control unit 72 may be implemented as a separate unit integrated within the sensor module 20 or may be located remote from the sensor module 20 and may be implemented with other vehicle control functions, such as a vehicle engine control unit. It should further be appreciated that functions performed by the application control unit 72 may be performed by the video microcontroller 52, without departing from the teachings of the present invention.

The camera component 20 generally captures camera images of an area in front of the vehicle 10. The radar component 30 may emit a fan-shaped radar beam so that objects generally in front of the vehicle reflect the emitted radar back to the sensor. The radar-camera processing unit 50 processes the radar and vision data collected by the corresponding camera component 22 and radar component 30 and may process the information in a number of ways. One example of processing of radar and camera information is disclosed in U.S. Patent Application Publication No. 2007/0055446, which is assigned to the assignee of the present application, the disclosure of which is hereby incorporated herein by reference.

Referring to FIGS. 3 and 4, the sensor module 20 is generally illustrated having a housing 100 containing the various components thereof. The housing 100 may include a polymeric or metallic material having a plurality of walls that generally contain and enclose the components therein. Housing 100 has an angled top surface 102 shaped to conform to the interior shape of the vehicle windshield 12. Angled surface 102 may be connected to windshield 12 via an adhesive, according to one embodiment. According to other embodiments, housing 100 may otherwise be attached to windshield 12 or to another location behind the windshield 12 within the passenger compartment of the vehicle 10.

The sensor module 20 has the camera component 22 generally shown mounted near an upper end and the radar component 30 is mounted generally therebelow. However, the camera component 22 and radar component 30 may be located at other locations relative to each other. The radar component 30 includes a vertical oriented antenna 48 mounted generally at the forward side of the radar component 30 for providing a vertical polarized signal. The radar antenna 48 may be a planar antenna such as a patch antenna. A glare shield 28 is further provided shown as a lower wall of the housing 100 generally below the camera 22. The glare shield 28 generally shields light reflection or glare from adversely affecting the light images received by the camera 22. This includes preventing glare from reflecting off of the vehicle dash or other components within the vehicle and into the imaging view of the camera 22. Additionally or alternately, an electromagnetic interference (EMI) shield may be located in front or below the radar sensor component 30. The EMI shield may generally be configured to constrain the radar signals to a generally forward direction passing through the windshield 12, and to prevent or minimize radar signals that may otherwise pass into the vehicle 10. It should be appreciated that the camera component 22 and radar sensor component 30 may be mounted onto a common circuit board which, in turn, communicates with the control circuitry 50, all housed together within the housing 100.

Figure 5:
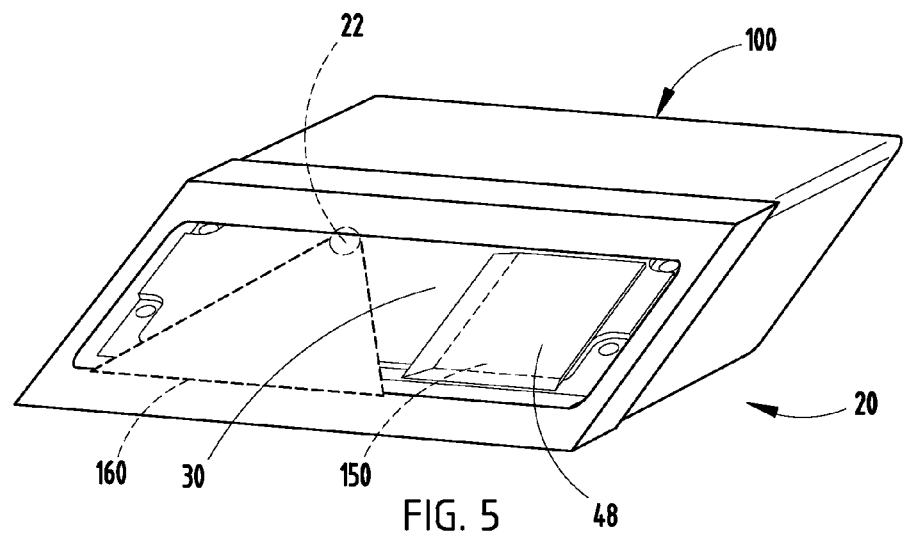
FIG. 5 is a perspective view of an integrated radar-camera sensor employing a tilted radar antenna, according to another embodiment.
Figure 6:
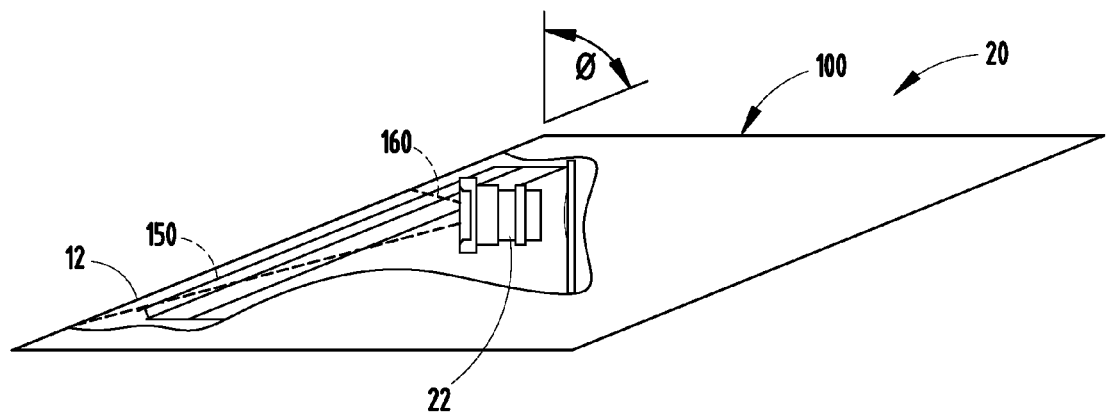
FIG. 6 is a side view of the integrated radar-camera sensor employing the tilted radar antenna in FIG. 5.

Referring to FIGS. 5 and 6, an integrated radar-camera sensor module 20 is generally illustrated having a tilted antenna 48 oriented in a plane at any angle relative to the vertical axis, according to another embodiment. Thus, the radar antenna 48 is tilted at an angle $\Phi$ relative to the vertical orientation of the embodiment shown in FIG. 4. According to one embodiment, the radar antenna may be tilted at angle $\Phi$ in the range of about ten degrees (10°) to seventy degrees (70°) relative to the vertical orientation. According to one embodiment, the radar antenna 48 is tilted at the same angle $\Phi$ generally as the angle of the windshield 12. By tilting the radar antenna 48, the height of the overall package housing 100 may be reduced. However, in order to compensate for the tilting of the antenna 48, the radar beam is squinted downward to illuminate the required coverage zone. Squinting of the radar signal may be achieved by an antenna feed network providing a designed phase slope.

Figure 7:
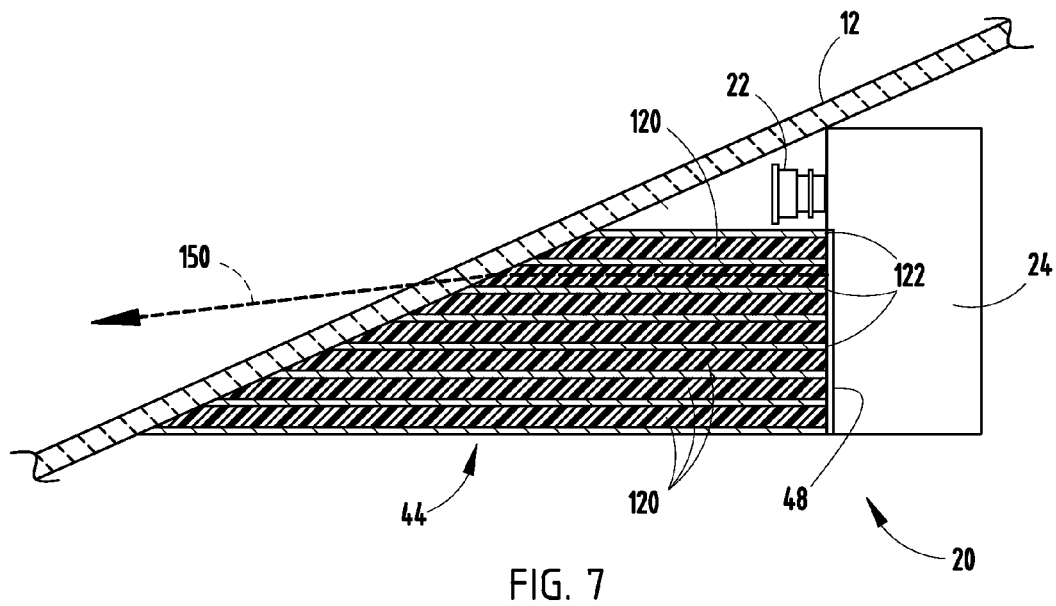
FIG. 7 is a side cross-sectional view of an integrated radar-camera sensor employing an electromagnetic interference (EMI) shield, according to another embodiment.

Referring to FIG. 7, an integrated radar-camera sensor module 20 is illustrated according to a third embodiment employing a parallel plate lens structure 44 generally positioned forward of the radar sensor 30. The parallel plate lens also functions as an EMI shield. The parallel plate lens 44 includes a plurality of substantially horizontal conductive plates or sheets 122 extending from the vertical oriented antenna 48 of the radar component 30 to the interior surface of the vehicle windshield 12. The conductive parallel plates 122 may comprise parallel copper sheets which are dielectrically isolated from each other and are separated therefrom by a distance such as one half the operating wavelength of the radar in the lens, where the operating wavelength in the lens depends on the free space wavelength of the radar and the properties of the material, if any, used between the parallel plates. In the embodiment shown, the parallel plate lens 44 further includes a dielectric foam 120 disposed between adjacent layers of the conductive sheets 122. The dielectric foam is electrically nonconductive and supports the horizontal layering of the conductive sheets 122. The dielectric foam 120 has a dielectric constant that provides beam squint in the downward direction such that the radar beam 150 is redirected at an adjusted angle toward the roadway in front of the vehicle 10 as it passes through the windshield 12. In effect, the conductive sheets 122 and dielectric foam 120 may operate as a lens which extends the antenna aperture up to the windshield 12 and squints down the radar beam while operating as an electromagnetic interference shield. The EMI shield may encompass the fan out of the radar beam beginning from the antenna out to the projection of the beam on the windshield.

The parallel plate lens serves to reduce the size of the EMI shield since, when using the lens, the radar beam does not fan out until it reaches the windshield 12. Without incorporating the lens into the EMI shield, the radar beam projection on the windshield is much larger necessitating a much larger EMI shield.

Figure 8:
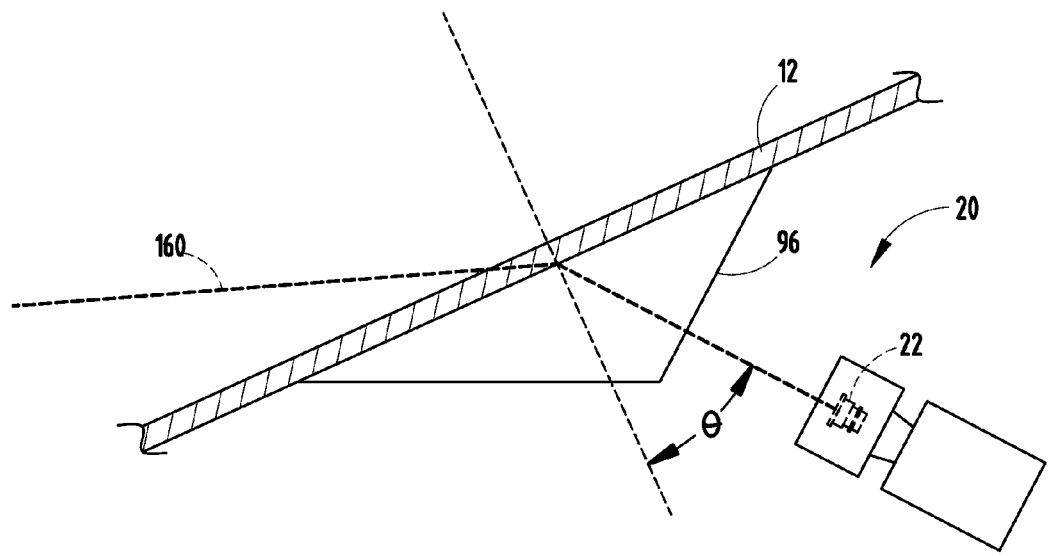
FIG. 8 is a side view of an integrated radar-camera sensor employing a refractive block, according to a further embodiment.

Referring to FIG. 8, a refractive block 96 is shown adhered to the front interior surface of the windshield 12 in front of the camera 22 such that the refractive block 96 is in the optical line of sight of camera 22. The refractive block 96 may include a light-entrance surface configured to be mounted in contact with a refractive boundary of the vehicle, namely, the windshield 12, and a light exit surface wherein the refractive block 96 is configured to refract an optical path of light corresponding to an imaged area and to direct the light to an image sensing component, namely, the camera 22. Light enters the refractive block 96 and enters into an air gap before entering the lens of the camera 22 as shown. Alternately, the air gap may be eliminated with proper lens optimization. The bottom and sides of the refractive block 96 may further be roughened to reduce reflectivity and may be painted an opaque color, such as black. One example of the refractive block 96 is disclosed in U.S. Pat. No. 7,095,567, assigned to the assignee of the present application, the entire disclosure of which is hereby incorporated herein by reference.

The refractive block 96 is shown having an incidence angle Φ of approximately seventy degrees (70°), according to one example. The incidence angle Φ generally is the angle between the camera 22 and the windshield 12 and a line perpendicular to the windshield 12. As optical light captured by the camera 22 passes through the windshield 12 and the refractive block 96, the light images are refracted toward the camera 22. The opaque surface on the bottom side of the refractive block 96 and also on the sides thereof may advantageously prevent reflectivity of light or glare to the camera component 22 thereby providing the function of a glare shield but with smaller overall dimensions than a conventional glare shield. The refractive block 96 may further operate to shield the radar sensor component 30 from electromagnetic interference.

Figure 9:
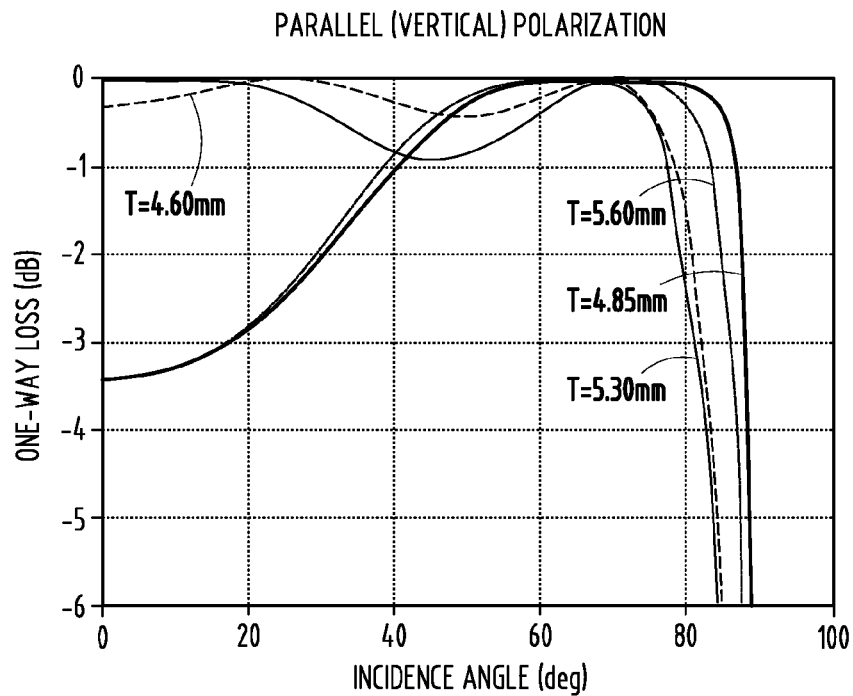
FIG. 9 is a graph illustrating reflection loss versus incidence angle for parallel (vertical) polarization provided by a radar antenna.
Figure 10:
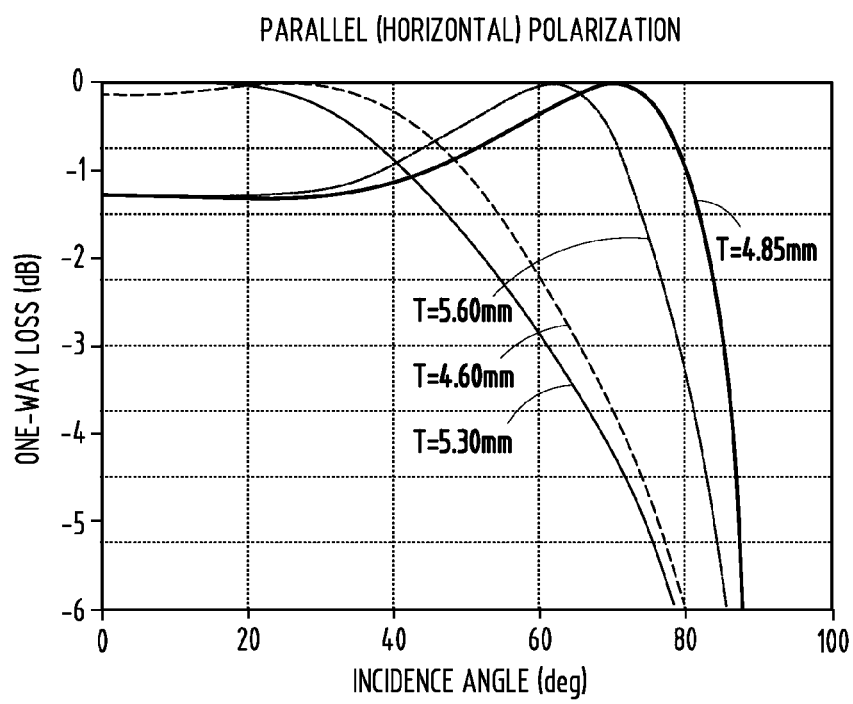
FIG. 10 is a graph illustrating reflection loss versus incidence angle for a perpendicular (horizontal) polarization provided by a radar antenna.
Figure 11:
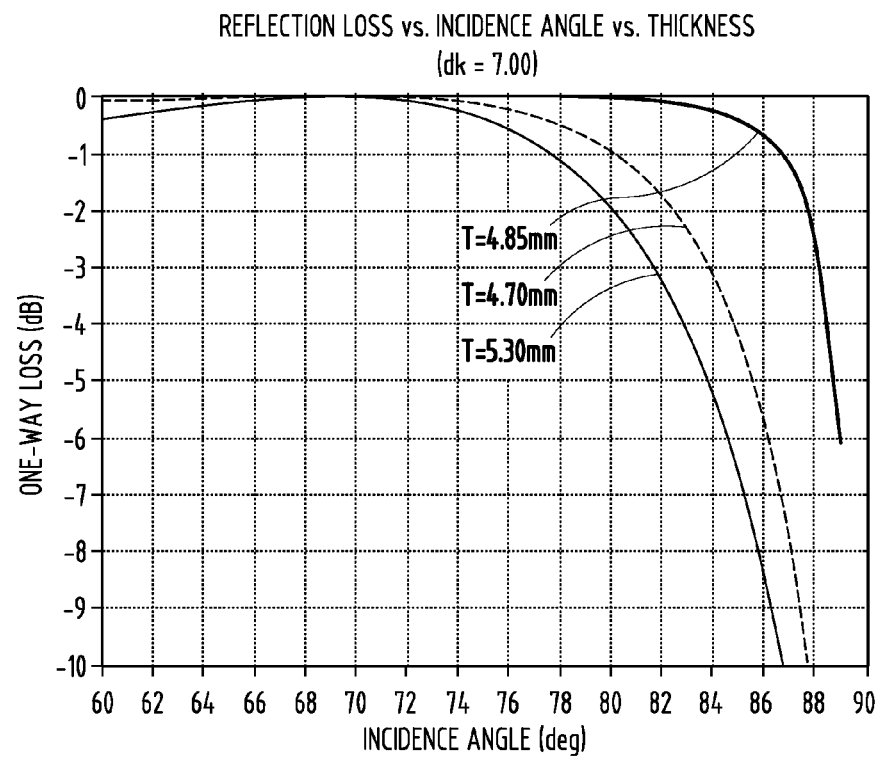
FIG. 11 is a graph illustrating sensitivities near and beyond the Brewster angle at 76.5 gigahertz (GHz) vertical polarization.
Figure 12:
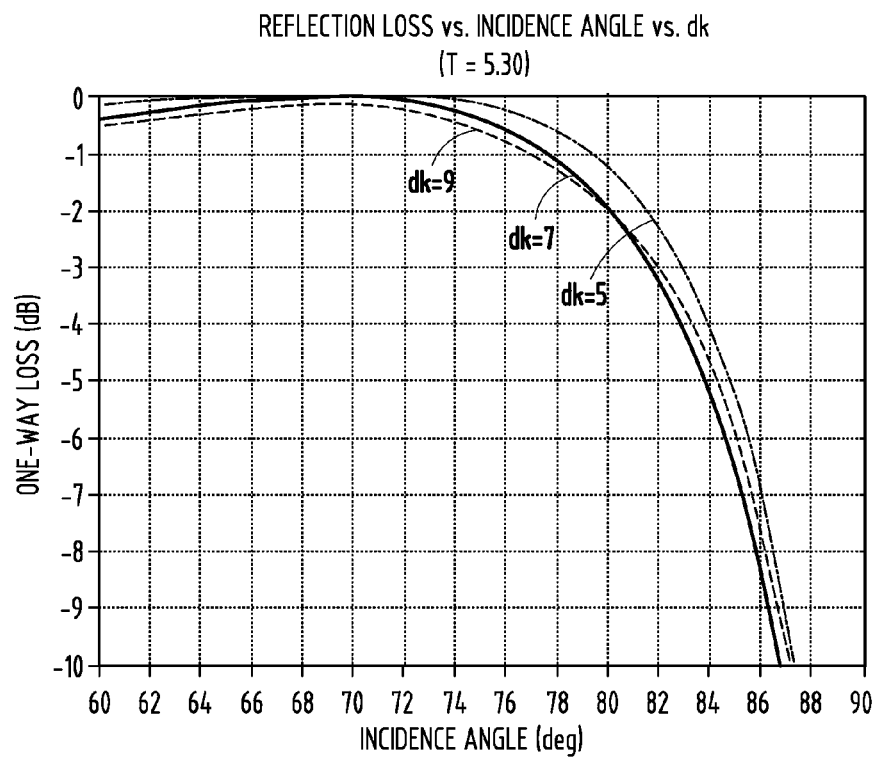
FIG. 12 is a graph illustrating sensitivities near and beyond the Brewster angle at 76.5 gigahertz vertical polarization.

The radar antenna 48 is designed with vertical polarization to mitigate RF propagation issues which may be introduced by the windshield 12. The typical vehicle windshield reflection loss may vary depending upon thickness and incidence angle of the windshield 12. The one-way reflection loss in decibels (dB) at a radar frequency of 76.5 GHz and using parallel (vertical) polarization achieved with the vertical polarization antenna 48 is illustrated in FIG. 9 for a windshield having various thicknesses and as a function of incidence angle of the windshield in degrees. The vertical polarization provides good propagation near seventy degree (70°) incidence angle with low sensitivity to incidence angle and windshield thickness. In contrast, a perpendicular (horizontal) polarization antenna is much more sensitive to incidence angle and windshield thickness and typically generates greater reflection loss in a windshield as shown in FIG. 10. Accordingly, the parallel vertical polarization antenna provides better propagation for typical windshield parameters. The sensitivities near and beyond the Brewster angle at a frequency of 76.5 GHz for vertical polarization is illustrated in FIGS. 11 and 12. The graphs shown in FIGS. 11 and 12 generally illustrate the reflection loss versus incidence angle versus windshield thickness in FIG. 11 and versus windshield dielectric constant (dk) in FIG. 12. The reflection loss is relatively insensitive to thickness for an incidence angle of less than seventy-eight degrees (78°), and the reflection loss is relatively insensitive to dk for nominal dk of 7.0 (the typical dk for windshield glass).

Figure 13:
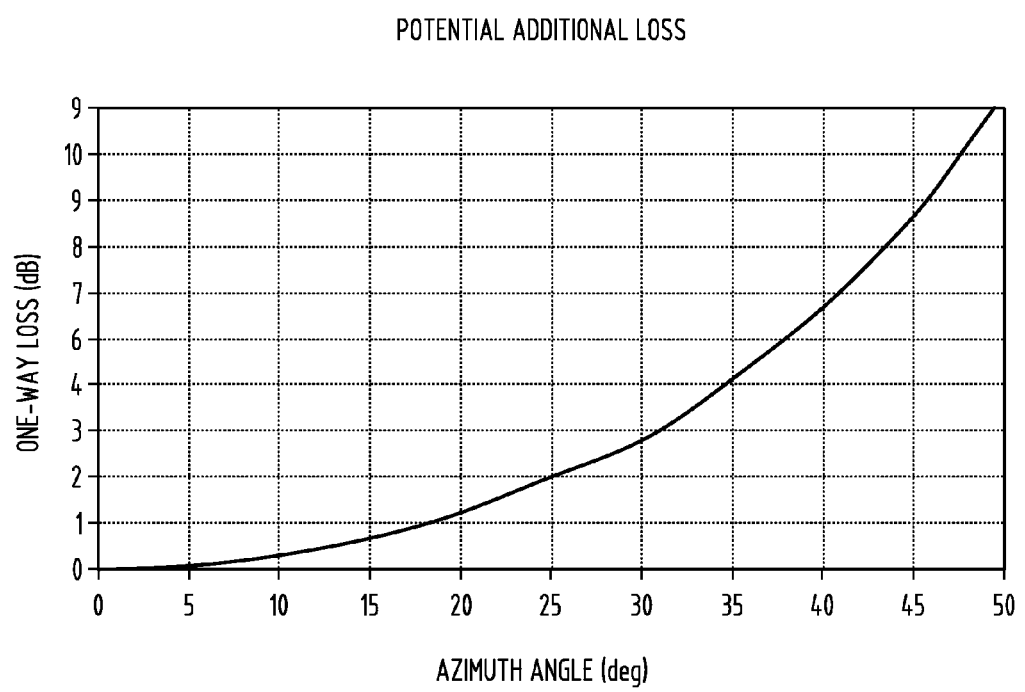
FIG. 13 is a graph illustrating potential additional loss and the impact of the azimuth angle.

Referring to FIG. 13, the impact of the azimuth angle is generally illustrated in terms of potential additional loss due to reflection loss of windshield based on the azimuth angle. The two-way reflection loss versus azimuth angle shows that an azimuth angle of ±twenty-two and one half degrees (22.5°) for a total coverage zone angle of forty-five degrees (45°) provides for acceptable minimal additional losses.

To minimize package size and overall sensor cost, the sensor module 20 is designed with common (shared) electronics and signal processor subsystems for the radar and camera front-ends. Further, the camera optics and imager are integrated into the radar antenna board (a wafer scale camera can be incorporated if needed for integration into the antenna board). The shared signal processor architecture enables fusion of low-level radar and camera data that, in the case of separate radar and camera modules, would otherwise require a high bandwidth interface with attendant increase in cost. Low-level data fusion provides the opportunity for improvements in object size estimation (e.g., length and width), object classification, road geometry estimation, etc.

Installation behind the windshield 12 may require the glare shield 28 for optimal performance of the camera 22. Further, the EMI shield 44 may be required or expected to allow optimal use of the radar 30. In either case, the shield structures may extend out to meet the windshield 12. A glare shield or EMI shield may fan-out in size from the camera and/or radar antenna in order to not obscure their field of view and may lead to a larger package size due to the rake angle of the windshield. Incorporation of the EMI shield may obviate the need for a separate camera glare shield. Otherwise, use of refractive block optics is included to eliminate the camera glare shield. To minimize the size of the radar EMI shield, a lens structure for parallel plate propagation may be used to effectively translate the antenna 48 to the windshield 12 without fan-out of the radar beam. Further, the lens structure may be designed with a dielectric material to squint the beam as needed to obtain the required elevation pointing and coverage.

Another option to minimize the size of (or perhaps eliminate the need for) the glare shield or EMI shield is to incorporate the radar antenna 48 with tilt-back to orient the antenna parallel (or nearly parallel) to the windshield 12. The distance between the windshield 12 and the antenna 48 and camera 22 is thereby minimized and the growth in module package size to extend any outer shield to the windshield 12 is also minimized The radar antenna 48 is then designed with substantial squint in elevation to obtain the required elevation pointing and coverage.

Alignment of the radar and camera components 22 and 30 to each other and to the vehicle 10 is typically required for proper system performance. The sensor module 20 is designed to support a "net-build" approach, that is, adequate margin in sensor coverage is implemented to eliminate the need for adjustable mechanical alignment features. The joint radar-camera alignment concept incorporates camera-based electronic alignment in the vehicle assembly plant for initial alignment of the system. Then, during on-road operation, camera-based automatic electronic alignment is used to maintain alignment to the vehicle and sensor fusion is used to electronically align the radar 30 to the camera 22.

Cost reduction is achieved due to integration of the radar and camera components 22 and 30 in a single module 20 using common (shared) subsystems and integrated packaging as described above. Further, installation costs are reduced in two ways; the need to install only a single module and installation of the module 20 behind the windshield 12. In contrast, current systems typically employ separate radar and camera modules, with the camera typically installed behind the windshield 12 and the radar typically installed in the front grille area or behind the front bumper. Radar installation in this area often leads to costly mounting brackets and/or costly modifications to the vehicle grille or bumper. Further, the radar component is susceptible to damage in a frontal impact leading to potentially higher repair cost compared to installation behind the windshield.

Further cost reduction is possible with optimized radar-camera fusion to exploit the complementary sensor attributes to minimize the specifications, and thereby cost, of the radar component. That is, the cost of stand-alone radar systems is often driven by the need for multiple narrow beams to meet angle accuracy and angle discrimination requirements. Integration of the camera 22 with appropriate data fusion algorithms can minimize the angle accuracy and discrimination imposed on the radar component since the camera 22 inherently provides excellent angle capability.

Accordingly, the integrated radar-camera sensor 20 advantageously integrates the radar and camera into a single housing module which employs integrated control and signal processing circuitry to achieve an advanced integrated sensor for use in a vehicle 10. The sensor module 20 may be easily installed behind the windshield 12 of the vehicle 10 and may be effectively utilized to detect objects to one side of the vehicle 10, such as in front of the vehicle 10, and to measure the parameters of detected objects. The resulting integrated radar-camera sensor module 20 advantageously provides for an effective system that is cost affordable and provides advanced object detection capabilities.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A sensor module comprising:
a sensor module housing comprising a plurality of walls;
a camera component located in the module housing for capturing images based on light waves;
a radar sensor component located within the module housing for emitting a radar beam and receiving reflected radar signals, wherein a polarization of the radar beam is selected based on an angle of incidence relative to a window through which the radar beam passes; and
processing circuitry for processing the captured images and the received reflected radar signals and providing an indication of the detection of the presence of one or more objects.

2. The sensor module as defined in claim 1, wherein the sensor module is employed on a vehicle to detect the presence of one or more objects relative to the vehicle.

3. The sensor module as defined in claim 2, wherein the module housing is located behind a windshield of the vehicle so that the camera and radar sensor components detect signals passing through the windshield.

4. The sensor module as defined in claim 3, wherein the housing is attached to the vehicle windshield.

5. The sensor module as defined in claim 1, wherein the sensor module comprises a glare shield arranged in the housing to shield glare from the camera component.

6. The sensor module as defined in claim 1 further comprising an electromagnetic interference shield for shielding electromagnetic interference from the radar sensor component.

7. The sensor module as defined in claim 6, wherein the electromagnetic interference shield comprises a plurality of substantially horizontal conductive plates arranged to form a parallel plate lens and positioned so the radar beam passes therethrough.

8. The sensor module as defined in claim 7, wherein the parallel plate lens further comprises a dielectric foam disposed between adjacent conductive plates.

9. The sensor module as defined in claim 1 further comprising a refractive block disposed within a path of the camera component.

10. The sensor module as defined in claim 1, wherein the polarization is one of vertical polarization and horizontal polarization.

11. A sensor module for use on a vehicle for detecting one or more objects relative to the vehicle said sensor module comprising:
a sensor module housing behind a windshield of a vehicle;
a radar sensor component located within the housing behind the windshield and configured to emit a radar beam therethrough, wherein a polarization of the radar beam is selected based on an angle of incidence relative to the windshield through which the radar beam passes;
an electromagnetic interference shield disposed to one or more sides of the radar sensor component for shielding electromagnetic radiation from the radar sensor component; and
processing circuitry for processing radar signals received with the radar sensor component.

12. The sensor module as defined in claim 11 further comprising a camera component located in the sensor module housing.

13. The sensor module as defined in claim 12, wherein the processing circuitry further processes the captured images and determines detection of the presence of one or more objects.

14. The sensor module as defined in claim 12 further comprising a glare shield provided in the housing to shield glare from the camera component.

15. The sensor module as defined in claim 11, wherein the electromagnetic interference shield comprises a plurality of substantially horizontal conductive plates arranged to form a parallel plate lens and positioned so the radar beam passes therethrough.

16. The sensor module as defined in claim 15, wherein the parallel plate lens further comprises a dielectric foam disposed between adjacent conductive plates.

17. The sensor module as defined in claim 11, wherein the polarization is one of vertical polarization and horizontal polarization.

18. A method for detecting one or more objects relative to a vehicle said method comprising the steps of:
providing a camera component in a module housing;
providing a radar sensor component in the module housing to provide an integrated sensor module;
mounting the sensor module behind a windshield of the vehicle;
capturing images forward of the vehicle passing through the windshield with the camera component;
transmitting a radar beam forward of the vehicle through the windshield with the radar sensor component, wherein a polarization of the radar beam is selected based on an angle of incidence relative to the windshield where the radar beam passes through;

receiving reflected radar signals from one or more objects forward of the vehicle with the radar sensor component; and processing video images captured by the camera component and the reflected radar signals received by the radar sensor component for use in detecting an object relative to the vehicle.

19. The method as defined in claim 18 further comprising the step of arranging a glare shield in the housing to shield glare from the camera component.

20. The method as defined in claim 18 further comprising the step of arranging an electromagnetic interference shield relative to the radar sensor component.

21. The method as defined in claim 20, wherein the step of arranging an electromagnetic interference shield comprises arranging a plurality of horizontal conductive plates in front of the radar sensor component to form a parallel plate lens that the radar beam passes therethrough.

22. The method as defined in claim 21, wherein the step of arranging an electromagnetic interference shield further comprises tilting an antenna at an angle relative to a vertical plane and disposing a dielectric material between adjacent conductive plates to squint the radar beam.

23. The method as defined in claim 22 further comprising the step of further squinting the radar beam with a phase slope.

24. The method as defined in claim 18 further comprising the step of arranging a refractive block in the path of the camera component.

25. The sensor module as defined in claim 18, wherein the polarization is one of vertical polarization and horizontal polarization.

26. A sensor module for use on a vehicle to detect objects about the vehicle, said sensor module comprising:

a radar sensor configured to emit a radar beam through a window of the vehicle toward an area about the vehicle, and detect reflected radar signals from the area that pass through the window, wherein a polarization of the radar beam is selected based on an angle of incidence relative to the window.

27. The sensor module as defined in claim 26, wherein the polarization is one of vertical polarization and horizontal polarization.

28. The sensor module as defined in claim 26, wherein the windshield is formed of glass.

29. The sensor module as defined in claim 26, wherein said radar sensor comprises an antenna tilted back at an angle relative to a vertical plane and configured to squint the radar beam downward relative to a plane of the antenna.

30. The sensor module as defined in claim 26, wherein said sensor module further comprises a housing configured to house the radar sensor and be installed behind a windshield of the vehicle; and a camera component located within the housing, said camera component configured to capture images of an area about the vehicle based on light waves from the area that pass through the windshield.

31. The sensor module as defined in claim 30, wherein said sensor module further comprises processing circuitry configured to indicate a detection of an object about the vehicle based on the captured images and the reflected radar signals.

* * * * *